(12) United States Patent
He et al.

(10) Patent No.: US 11,568,556 B2
(45) Date of Patent: Jan. 31, 2023

(54) DEVICE, METHOD AND SYSTEM FOR DETERMINING FLIGHT HEIGHT OF UNMANNED AERIAL VEHICLE

(71) Applicant: Zhejiang University, Hangzhou (CN)

(72) Inventors: Yong He, Hangzhou (CN); Liwen He, Hangzhou (CN); Bingquan Chu, Hangzhou (CN)

(73) Assignee: Zhejiang University, Hangzhou (CN)

( * ) Notice: Subject to any disclaimer, the term of this patent is extended or adjusted under 35 U.S.C. 154(b) by 103 days.

(21) Appl. No.: 17/159,676

(22) Filed: Jan. 27, 2021

(65) Prior Publication Data

US 2022/0044434 A1 Feb. 10, 2022

(30) Foreign Application Priority Data

Aug. 10, 2020 (CN) .......................... 202010794874.4

(51) Int. Cl.
| | |
|---|---|
| *G06T 7/60* | (2017.01) |
| *G06T 7/73* | (2017.01) |
| *G06V 10/75* | (2022.01) |
| *G06V 20/10* | (2022.01) |
| *B64C 39/02* | (2006.01) |
| *G01C 5/02* | (2006.01) |
| *G01C 11/06* | (2006.01) |
| *G05D 1/10* | (2006.01) |
| *G06K 9/62* | (2022.01) |

(52) U.S. Cl.
CPC .............. *G06T 7/60* (2013.01); *B64C 39/024* (2013.01); *G01C 5/02* (2013.01); *G01C 11/06* (2013.01); *G05D 1/101* (2013.01); *G06K 9/6215* (2013.01); *G06T 7/73* (2017.01); *G06V 10/751* (2022.01); *G06V 20/188* (2022.01); *B64C 2201/145* (2013.01); *G06T 2207/10032* (2013.01); *G06T 2207/30188* (2013.01)

(58) Field of Classification Search
None
See application file for complete search history.

(56) References Cited

U.S. PATENT DOCUMENTS

| | | | |
|---|---|---|---|
| 2016/0198088 A1* | 7/2016 | Wang | B64D 47/08 |
| | | | 348/36 |
| 2021/0333107 A1* | 10/2021 | Syrstad | G06T 7/74 |
| 2022/0046220 A1* | 2/2022 | Zhong | G06T 7/33 |
| 2022/0076391 A1* | 3/2022 | Kang | H04N 5/2328 |

* cited by examiner

*Primary Examiner* — Samuel D Fereja
(74) *Attorney, Agent, or Firm* — HEA Law PLLC; Darrin A. Auito

(57) ABSTRACT

A method and system for determining flight height of an unmanned aerial vehicle (UAV) includes a determining device that includes a camera at bottom of the UAV carried on a three-axis self-stabilizing tripod head; and a carrier phase difference satellite positioning system (CPDSPS), a graphics processing computer (GPC) and a power supply system provided on top of the UAV The GPC is connected with the CPDSPS, the power supply system and the camera, respectively. An attitude and heading reference system (AHRS) is provided at the bottom of the three-axis self-stabilizing tripod head and connected with the GPC The GPC is configured to determine relative height of the UAV from a canopy of farmland surface crops according to position information acquired by the CPDSPS, attitude information acquired by the AHRS and ground orthographic image acquired by the camera, and determine flight height of the UAV according to the relative height.

4 Claims, 4 Drawing Sheets

| A plurality of ground orthographic images in an agricultural operation area and the position data and attitude data of an unmanned aerial vehicle at the time of acquiring the plurality of ground orthographic images are acquired. | ── S201 |

| A Gaussian difference pyramid is constructed according to pixel points in any two adjacent ground orthographic images. | ── S202 |

| The feature points in any two adjacent ground orthographic images are determined according to the Gaussian difference pyramid. | ── S203 |

| The feature points are matched in two adjacent ground orthographic images to determine a matching feature point pair. | ── S204 |

| The position of the matching feature point pair in space is determined according to the matching feature point pair. | ── S205 |

| The position of the unmanned aerial vehicle in space is determined according to the position data and attitude data of the unmanned aerial vehicle. | ── S206 |

| The relative height of the unmanned aerial vehicle from the canopy of farmland surface crops is determined according to the position of the unmanned aerial vehicle in space and the position of the matching feature point pair in space. | ── S207 |

| The flight height of the unmanned aerial vehicle is determined according to the relative height. | ── S208 |

FIG. 2

DEVICE, METHOD AND SYSTEM FOR DETERMINING FLIGHT HEIGHT OF UNMANNED AERIAL VEHICLE

CROSS-REFERENCE TO RELATED APPLICATIONS

This application claims priority to Chinese application number 202010794874.4, filed Aug. 10, 2020, with a title of Device, Method and System for Determining Flight Height of Unmanned Aerial Vehicle. The above-mentioned patent application is incorporated herein by reference in their entirety.

TECHNICAL FIELD

The present disclosure relates to the field of unmanned aerial vehicles (UAV), specifically to a device, a method and a system for determining the flight height of UAV.

BACKGROUND

When using an unmanned aerial vehicle (UAV) to acquire information of agricultural and forestry crops, because the optical imaging task device has the requirements of focal length and focal points, the unmanned aerial vehicle needs to keep a relatively stable distance from the photographed crops as much as possible during flight. If the stability cannot be kept at a relative altitude, there will often be "out of focus", which will lead to blurred images and acquiring no information that has been learned. When operating in plain areas, especially in leveled standard farmland, the unmanned aerial vehicle can fly at a fixed altitude. However, in terraced fields or hilly areas, unmanned aerial vehicles need to fly like the ground according to terrain data or other airborne devices.

At present, the accuracy of commonly used geographic information data is about 1 meter, and the height of crop canopy is not expressed. Common airborne devices such as a laser rangefinder and an ultrasonic rangefinder use the method of measuring several points and averaging to calculate the relative height. There are many problems here. Because of the interference of canopy density, soil moisture, air humidity and solar radiation, the relative height between the unmanned aerial vehicle and the crop canopy cannot be monitored stably.

SUMMARY

One object of the present disclosure is to provide a device, a method and a system for determining the flight height of an unmanned aerial vehicle, which can stably monitor the relative height between the unmanned aerial vehicle and the crop canopy, thereby realizing the accuracy of determining the flight height and the stability of data.

To achieve the above object, the present disclosure provides the following scheme:

A device for determining the flight height of an unmanned aerial vehicle, comprising an unmanned aerial vehicle, a three-axis self-stabilizing tripod head, a carrier phase difference satellite positioning system, an attitude and heading reference system, a graphics processing computer and a power supply system, wherein;

a camera at the bottom of the unmanned aerial vehicle is carried on the three-axis self-stabilizing tripod head, and the three-axis self-stabilizing tripod head is used to maintain the optical axis of the camera;

the carrier phase difference satellite positioning system, the graphics processing computer and the power supply system are all provided on the top of the unmanned aerial vehicle;

the graphic processing computer is connected with the carrier phase difference satellite positioning system, the power supply system and the camera, respectively;

the attitude and heading reference system is provided at the bottom of the three-axis self-stabilizing tripod head and is connected with the graphics processing computer;

the graphic processing computer is configured to determine the relative height of the unmanned aerial vehicle from the canopy of farmland surface crops according to the position information acquired by the carrier phase difference satellite positioning system, the attitude information acquired by the attitude and heading reference system and the ground orthographic image acquired by the camera, and determine the flight height of the unmanned aerial vehicle according to the relative height.

Preferably, the camera is a high-resolution visible light camera.

The present disclosure relates to a method for determining the flight height of an unmanned aerial vehicle, wherein the determining method is applied to the device for determining the flight height of an unmanned aerial vehicle, and the determining method comprises:

acquiring a plurality of ground orthographic images in an agricultural operation area and the position data and attitude data of an unmanned aerial vehicle at the time of acquiring the plurality of ground orthographic images;

constructing a Gaussian difference pyramid according to pixel points in any two adjacent ground orthographic images;

determining the feature points in any two adjacent ground orthographic images according to the Gaussian difference pyramid;

matching the feature points in two adjacent ground orthographic images to determine a matching feature point pair;

determining the position of the matching feature point pair in space according to the matching feature point pair;

determining the position of the unmanned aerial vehicle in space according to the position data and attitude data of the unmanned aerial vehicle;

determining the relative height of the unmanned aerial vehicle from the canopy of farmland surface crops according to the position of the unmanned aerial vehicle in space and the position of the matching feature point pair in space;

determining the flight height of the unmanned aerial vehicle according to the relative height.

Preferably, prior to constructing a Gaussian difference pyramid according to pixel points in any two adjacent ground orthographic images, the method further comprises:

calibrating pixel points in the ground orthographic image by using formulas $x_{corrected} = x(1+k_1r^2+k_2r^4+k_3r^6)$, $y_{corrected} = y(1+k_1r^2+k_2r^4+k_3r^6)$, $x_{corrected} = x+[2p_1xy+p_2(r^2+2x^2)]$ and $y_{corrected} = y+[p_1(r^2+2y^2)+2p_2xy]$; where $k_1$, $k_2$, and $k_3$ are radial distortion factors, $p_1$ and $p_2$ are tangential distortion factors, x and y are pixel point coordinates, $x_{corrected}$ and $y_{corrected}$ are the coordinates of the calibrated pixel points, and r is the distance from the pixel point to the image center point.

Preferably, matching the feature points in two adjacent ground orthographic images to determine a matching feature point pair specifically comprises:

constructing a feature description vector corresponding to each feature point according to the feature points in the ground orthographic image;

determining the Euclidean distance between the feature points in one ground orthographic image and the feature points in another ground orthographic image according to the feature description vector corresponding to each feature point;

taking the feature point pair whose Euclidean distance is less than the distance threshold as the matching feature point pair, wherein the matching feature point pair comprises two feature points and is located in different ground orthographic images.

A system for determining the flight height of an unmanned aerial vehicle comprises:

a data acquiring module configured to acquire a plurality of ground orthographic images in an agricultural operation area and the position data and attitude data of an unmanned aerial vehicle at the time of acquiring the plurality of ground orthographic images;

a Gaussian difference pyramid constructing module configured to construct a Gaussian difference pyramid according to pixel points in any two adjacent ground orthographic images;

a feature point determining module configured to determine the feature points in any two adjacent ground orthographic images according to the Gaussian difference pyramid;

a matching feature point pair determining module configured to match the feature points in two adjacent ground orthographic images to determine a matching feature point pair;

a position determining module of a matching feature point pair in space configured to determine the position of the matching feature point pair in space according to the matching feature point pair;

a position determining module of an unmanned aerial vehicle in space configured to determine the position of the unmanned aerial vehicle in space according to the position data and attitude data of the unmanned aerial vehicle;

a relative height determining module configured to determine the relative height of the unmanned aerial vehicle from the canopy of farmland surface crops according to the position of the unmanned aerial vehicle in space and the position of the matching feature point pair in space;

a flight height determining module configured to determine the flight height of the unmanned aerial vehicle according to the relative height.

Preferably, the system further comprises:

a pixel point calibrating module configured to calibrate pixel points in the ground orthographic image by using formulas $x_{corrected}=x(1+k_1r^2+k_2r^4+k_3r^6)$, $y_{corrected}=y(1+k_1r^2+k_2r^4+k_3r^6)$, $x_{corrected}=x+[2p_1xy+p_2(r^2+2x^2)]$ and $y_{corrected}=y+[p_1(r^2+2y_2)+2p_2xy]$; where $k_1$, $k_2$, and $k_3$ are radial distortion factors, $p_1$ and $p_2$ are tangential distortion factors, x and y are pixel point coordinates, $x_{corrected}$ and $y_{corrected}$ are the coordinates of the calibrated pixel points, and r is the distance from the pixel point to the image center point.

Preferably, the matching feature point pair determining module specifically comprises:

a feature description vector constructing unit configured to construct a feature description vector corresponding to each feature point according to the feature points in the ground orthographic image;

an Euclidean distance determining unit configured to determine the Euclidean distance between the feature points in one ground orthographic image and the feature points in another ground orthographic image according to the feature description vector corresponding to each feature point;

a matching feature point pair determining unit configured to take the feature point pair whose Euclidean distance is less than the distance threshold as the matching feature point pair, wherein the matching feature point pair comprises two feature points and is located in different ground orthographic images.

According to the specific embodiment provided by the present disclosure, the present disclosure discloses the following technical effects:

According to the device, method and system for determining the flight height of an unmanned aerial vehicle, the longitude and latitude coordinates of the current unmanned aerial vehicle, the attitude information of the camera and the ground orthographic image are acquired in real time during the flight of the unmanned aerial vehicle, the relative height between the current unmanned aerial vehicle and the canopy of farmland surface crops is calculated, and the flight height of the unmanned aerial vehicle is determined according to the relative height. Under the guidance of the relative height, when unmanned aerial vehicle flies like the ground, it can objectively control the flying altitude according to the crop canopy, so as to achieve the accuracy of acquiring information and the stability of data.

BRIEF DESCRIPTION OF THE DRAWINGS

To explain the embodiments of the present disclosure or the technical scheme in the prior art more clearly, the drawings needed in the embodiments will be briefly introduced hereinafter. Obviously, the drawings in the following description are only some embodiments of the present disclosure. For those skilled in the art, other drawings can be obtained according to these drawings without paying creative labor.

FIG. 2 is a flow chart of a method for determining the flight height of an unmanned aerial vehicle according to the present disclosure;

DETAILED DESCRIPTION

The technical scheme in the embodiments of the present disclosure will be described clearly and completely with reference to the drawings in the embodiments of the present disclosure hereinafter. Obviously, the described embodiments are only some embodiments of the present disclosure, rather than all of the embodiments. Based on the embodiments of the present disclosure, all other embodiments obtained by those skilled in the art without paying creative labor belong to the scope of protection of the present disclosure.

The present disclosure aims to provide a device, a method and a system for determining the flight height of an unmanned aerial vehicle, In order to make the above objects, features and advantages of the present disclosure more obvious and understandable, the present disclosure will be further explained in detail with reference to the drawings and specific embodiments hereinafter.

Figure 1:
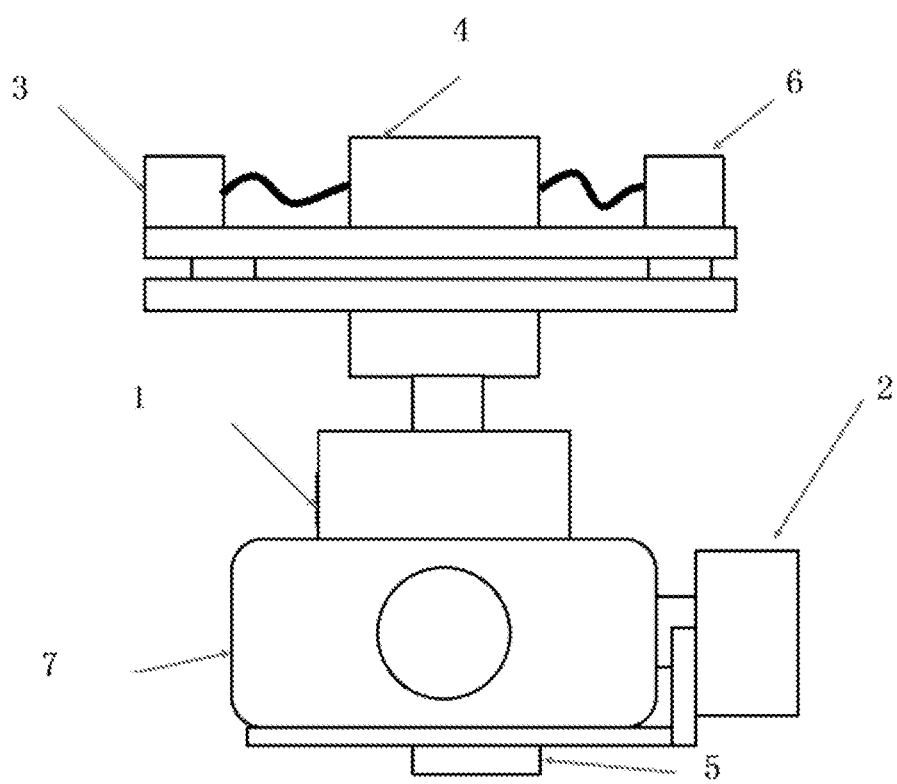
FIG. 1 is a structural schematic diagram of a device for determining the flight height of an unmanned aerial vehicle according to the present disclosure.

FIG. 1 is a structural schematic diagram of a device for determining the flight height of an unmanned aerial vehicle according to the present disclosure. As shown in FIG. 1, the device for determining the flight height of an unmanned aerial vehicle according to the present disclosure comprises an unmanned aerial vehicle 1, a three-axis self-stabilizing tripod head 2, a carrier phase difference satellite positioning system 3, an attitude and heading reference system 4, a graphics processing computer 5 and a power supply system 6.

The camera 7 at the bottom of the unmanned aerial vehicle 1 is carried on the three-axis self-stabilizing tripod head 2, and the three-axis self-stabilizing tripod head 2 is used to maintain the optical axis of the camera 7. The camera 7 is a high-resolution visible light camera.

The carrier phase difference satellite positioning system 3, the graphics processing computer 5 and the power supply system 6 are all provided on the top of the unmanned aerial vehicle 1.

The graphic processing computer 5 is connected with the carrier phase difference satellite positioning system 3, the power supply system 6 and the camera 7, respectively.

The attitude and heading reference system 4 is provided at the bottom of the three-axis self-stabilizing tripod head 2 and is connected with the graphics processing computer 5.

The graphic processing computer 5 is configured to determine the relative height of the unmanned aerial vehicle 1 from the canopy of farmland surface crops according to the position information acquired by the carrier phase difference satellite positioning system 3, the attitude information acquired by the attitude and heading reference system 4 and the ground orthographic image acquired by the camera 7, and determine the flight height of the unmanned aerial vehicle according to the relative height.

The provided specific working process of the device for determining the flight height of the unmanned aerial vehicle is as follows.

When the unmanned aerial vehicle 1 flies in the agricultural operation area with complex terrain, the graphics processing computer 5 can continuously send out trigger instructions according to the currently measured longitude and latitude coordinate data, control the high-resolution visible light camera 7 carried on the three-axis self-stabilizing tripod head 2 to continuously complete acquisition of a plurality of images in a vertical downward posture, and control the carrier phase difference satellite positioning system 3 and the attitude and heading reference system 4 to acquire the current position information and attitude information of the high-resolution visible light camera 7. The above information is transmitted to the high-performance graphics processing computer 5 through the data line for processing.

FIG. 2 is a flow diagram of a method for determining the flight height of an unmanned aerial vehicle according to the present disclosure. As shown in FIG. 2, the method for determining the flight height of an unmanned aerial vehicle according to the present disclosure is applied to the device for determining the flight height of an unmanned aerial vehicle described above, and the determining method comprises the following steps.

Figure 3:
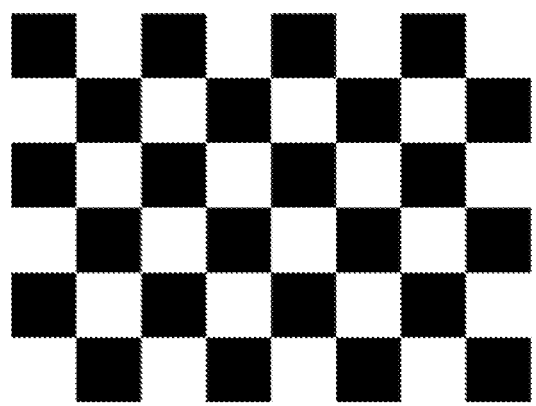
FIG. 3 is a schematic diagram of a black-and-white checkerboard calibration board according to the present disclosure.

S201, a plurality of ground orthographic images in an agricultural operation area and the position data and attitude data of an unmanned aerial vehicle at the time of acquiring the plurality of ground orthographic images are acquired. Before using the camera, the internal parameters of the visible light camera are calibrated by using the black-and-white checkerboard with an interval of 25 mm, as shown in FIG. 3. More than 8 images of the calibration board with different angles need to be acquired, and then are input into the opencv running library to automatically calculate the calibration parameters by using the Complete Camera Toolbox of Calibration.

S202, a Gaussian difference pyramid is constructed according to pixel points in any two adjacent ground orthographic images.

Prior to S202, the method further comprises:
calibrating pixel points in the ground orthographic image by using formulas) $x_{corrected}=x(1+k_1r^2+k_2r^4+k_3r^6)$, $y_{corrected}=y(1+k_1r^2+k_2r^4+k_3r^6)$, $x_{corrected}=x+[2p_1xy+p_2(r^2+2x^2)]$ and $y_{corrected}=y+[p_1(r^2+2y_2)+2p_2xy]$; where $k_1$, $k_2$, and $k_3$ are radial distortion factors, $p_1$ and $p_2$ are tangential distortion factors, x and y are pixel point coordinates, $x_{corrected}$ and $y_{corrected}$ are the coordinates of the calibrated pixel points, and r is the distance from the pixel point to the image center point.

The specific process of constructing a Gaussian difference pyramid is as follows.

The Gaussian pyramid is divided into 0 groups, and each group is divided into S layers. The resolution of images in each group is the same. With the increase of pyramid height, the image becomes more blurred. The number of layers S of the pyramid is four. Its original image resolution determines the number of groups of the Gaussian pyramid. The calculating formula is as follows:

$$O=\lfloor \log_2 \min(X,Y)-2 \rfloor$$

where X and Y represent the length and width of the original image, and $\lfloor \ \rfloor$ means rounding down.

To construct the Gaussian difference pyramid, it is necessary to blur and smooth the original image, and generate the image layer by layer, thus forming the LOG (Laplace of Gaussians) scale space of $L(x, y, \sigma)$. It is calculated by convolution of Gaussian function $G(x, y, \sigma)$ and image $I(x, y)$. The formula is $L(x, y, \sigma)=G(x, y, \sigma)\otimes I(x, y)$, where x and y represent the coordinate values of the horizontal axis and the vertical axis of pixel points on the image, $\otimes$ represents convolution calculation, and the calculation formula of $G(x, y, \sigma)$ is as follows:

$$G(x, y, \sigma) = \frac{1}{2\pi\sigma^2} e^{\frac{x^2+y^2}{2\sigma^2}}$$

where $\sigma$ is the scale space factor, and the larger the value $\sigma$, the larger the image processing range, and the smoother the image, x and y are the pixel point coordinates. Assume that the scale space factor of the original image is 0.5. That is, the image scale $\sigma_{(0,0)}$ of group 0 and layer 0 of the Gaussian pyramid is 0.5, so that the calculation formula of the scale space factor of group p and layer q is as follows:

$$\sigma_{(p,q)}=2^{p+q}*\sigma_{(0,0)}$$

The LOG scale space $L(x, y, \sigma)$ can be calculated by combining the above formulas. The DOG (Difference of Gaussians) difference Gaussian pyramid can be calculated by making difference between adjacent lower images and upper images in each group. For example, group p and layer q+1 are subtracted from group p and layer q in LOG space to obtain the image of group p and layer q of the DOG difference Gaussian pyramid.

After the DOG difference Gaussian pyramid is constructed, it is comprehensively judged whether the pixel point is an extreme point in the range of adjacent pixel points in the current scale space and the adjacent scale space, and then the position of feature points can be obtained.

S203, the feature points in any two adjacent ground orthographic images are determined according to the Gaussian difference pyramid.

S204, the feature points are matched in two adjacent ground orthographic images to determine a matching feature point pair.

S204 specifically comprises:

constructing a feature description vector corresponding to each feature point according to the feature points in the ground orthographic image;

determining the Euclidean distance between the feature points in one ground orthographic image and the feature points in another ground orthographic image according to the feature description vector corresponding to each feature point;

taking the feature point pair whose Euclidean distance is less than the distance threshold as the matching feature point pair, wherein the matching feature point pair comprises two feature points and is located in different ground orthographic images.

As a specific embodiment, the specific matching process of feature points is as follows.

According to the position information of a feature point, the scale value a of the feature point can be known, and the Gaussian image of the scale value can be obtained according to this scale value. The amplitude angle and the amplitude value of the pixel gradient of each point in the image are calculated in the area with the radius 3*1.5σ. The calculation formula is as follows:

$$m(x, y) = \sqrt{(L(x+1, y) - L(x-1, y))^2 + (L(x, y+1) - L(x, y-1))^2}$$

$$\theta(x, y) = \arctan\left(\frac{L(x, y+1) - L(x, y-1)}{L(x+1, y) - L(x-1, y)}\right)$$

After the amplitude angle and the amplitude value are calculated, the amplitude angle from 0° to 360° is divided into 36 intervals, each interval is 10°, and the sum of the amplitude values of the points falling in each amplitude value interval is counted. The direction in which the sum of the amplitude values is maximal is the main direction of the feature point.

With the feature point as the center, the position and direction of pixel points in the area $15\sqrt{2}\sigma * 15\sqrt{2}\sigma$ near the feature point are rotated until the main direction of the feature point coincides with the x axis. After rotation, an area 12σ*12σ is taken from the rotated image with the feature point as the center, and the area is divided into 4*4 subregions at equal intervals. The size of each area is 3σ. 0° to 360° is divided into 8 angle intervals according to the range of 45° in each sub-region. The amplitude accumulation value of each angle interval is calculated, and Gaussian weighting processing is carried out according to the distance from each point to the feature point, forming a 128-dimensional SIFT feature vector as the descriptor of the feature point.

The Euclidean distance between two vectors is calculated according to the feature vectors of feature points of one of the two images and the feature vectors of all feature points of the other image. If the ratio of the distance to the nearest feature point and the distance to the next closest feature point is less than 0.79, then the feature point and the feature point with the closest distance in the other image can be considered as paired as a pair of feature points.

By filtering the matched feature points, the pixel point positions (unit: pixel): ($w_n$, $h_n$) and ($w_{n+1}$, $h_{n+1}$) of the matched feature points in a rectangular coordinate system (hereinafter referred to as an image coordinate system) with the upper left corner of the image as the origin, the positive direction of x axis from left to right and the positive direction of y axis from top to bottom.

S205, the position of the matching feature point pair in space is determined according to the matching feature point pair.

The position of the matching feature point pair in space is (x, $y_1$, $z_1$), $$\begin{bmatrix} x_t \\ y_t \\ z_t \end{bmatrix} = (I^T I)^{-1} I^T J,$$

where I and J are both matrices. $I^T$ represents the transposition of a matrix. I and J are as follows:

$$I = \begin{bmatrix} w_n m_{31}^n - m_{11}^n & w_n m_{32}^n - m_{12}^n & w_n m_{33}^n - m_{13}^n \\ w_n m_{31}^n - m_{21}^n & w_n m_{32}^n - m_{22}^n & w_n m_{33}^n - m_{23}^n \\ w_n m_{31}^{n+1} - m_{11}^{n+1} & w_n m_{32}^{n+1} - m_{12}^{n+1} & w_n m_{33}^{n+1} - m_{13}^{n+1} \\ w_n m_{31}^{n+1} - m_{11}^{n+1} & w_n m_{32}^{n+1} - m_{22}^{n+1} & w_n m_{33}^{n+1} - m_{23}^{n+1} \end{bmatrix}$$

$$J = \begin{bmatrix} m_{14}^n - w_n m_{34}^n \\ m_{24}^n - h_n m_{34}^n \\ m_{14}^{n+1} - w_{n+1} m_{34}^{n+1} \\ m_{24}^{n+1} - h_{n+1} m_{34}^{n+1} \end{bmatrix}$$

where $m_{pq}^n$ represents the elements in row p and column q of the image feature matrix $M_n$ that can be calculated in the n-th image.

The calculation formula of $M_n$ is as follows (the same is for $M_{n+1}$):

$$M_n = \begin{bmatrix} g_x & 0 & o_x & 0 \\ 0 & g_y & o_y & 0 \\ 0 & 0 & 1 & 0 \end{bmatrix} \begin{bmatrix} R_n & T_n \\ 0 & 1 \end{bmatrix}$$

where $o_x$ and $o_y$ respectively represent the coordinate values (unit: pixel) of the central pixel point in the image coordinate system in x axis and y axis in the n-th image. The parameter $g_x$ and $g_y$ and the matrix $T_n$ are calculated according to the following formula:

$$g_x = \frac{f}{e_x}$$

$$g_y = \frac{f}{e_y}$$

$$T_n = [x_n \quad y_n \quad z_n]$$

In the above formula, f represents the focal length (unit: mm) of the visible light camera lens, and $e_x$ and $e_y$ are the length corresponding to each pixel on the camera photosensitive element in x axis and y axis with the unit of mm/pixel.

According to the above formula, the coordinate information ($x_t$, $y_t$, $z_t$) of the feature points in the real map coordinate system is calculated.

S206, the position of the unmanned aerial vehicle in space is determined according to the position data and attitude data of the unmanned aerial vehicle.

Taking the n-th image and the (n+1)-th image as an example, based on the data in step 2, the three-dimensional space coordinates $(x_n, y_n, z_n)$ in the three-dimensional space coordinate system (hereinafter referred to as the real map coordinate system) with RTK-GPS system reference station as the origin, x-axis forward direction in the east, y-axis forward direction in the north and z-axis forward direction in the vertical direction when taking the n-th image, and the three-dimensional space coordinates $(x_{n+1}, y_{n+1}, z_{n+1})$ when taking the (n+1)-th image, can be obtained, with the unit of m.

It can be obtained from the attitude and heading reference system that when taking images, the coordinate system with the camera as the origin (hereinafter referred to as: camera coordinate system) rotates to the real map coordinate system, and the rotation angles around the x axis, y axis and z axis are $\alpha$, $\beta$ and $\gamma$ (unit: °). The following rotation matrix is formed:

$$R_n = \begin{bmatrix} \cos\beta\cos\gamma & \cos\alpha\sin\gamma + \sin\alpha\sin\beta\cos\gamma & \sin\alpha\sin\gamma - \cos\alpha\sin\beta\cos\gamma \\ -\cos\beta\sin\gamma & \cos\alpha\cos\gamma + \sin\alpha\sin\beta\sin\gamma & \sin\alpha\cos\gamma + \cos\alpha\sin\beta\sin\gamma \\ \sin\beta & -\sin\alpha\cos\beta & \cos\alpha\cos\beta \end{bmatrix}$$

S207, the relative height of the unmanned aerial vehicle from the canopy of farmland surface crops is determined according to the position of the unmanned aerial vehicle in space and the position of the matching feature point pair in space.

The height difference between the surface position where the feature points are located and the aircraft in the vertical direction and the current three-dimensional space coordinates of the unmanned aerial vehicle are interpolated to obtain the height of the unmanned aerial vehicle relative to the canopy surface of the surface crops.

S208, the flight height of the unmanned aerial vehicle is determined according to the relative height.

Figure 4:
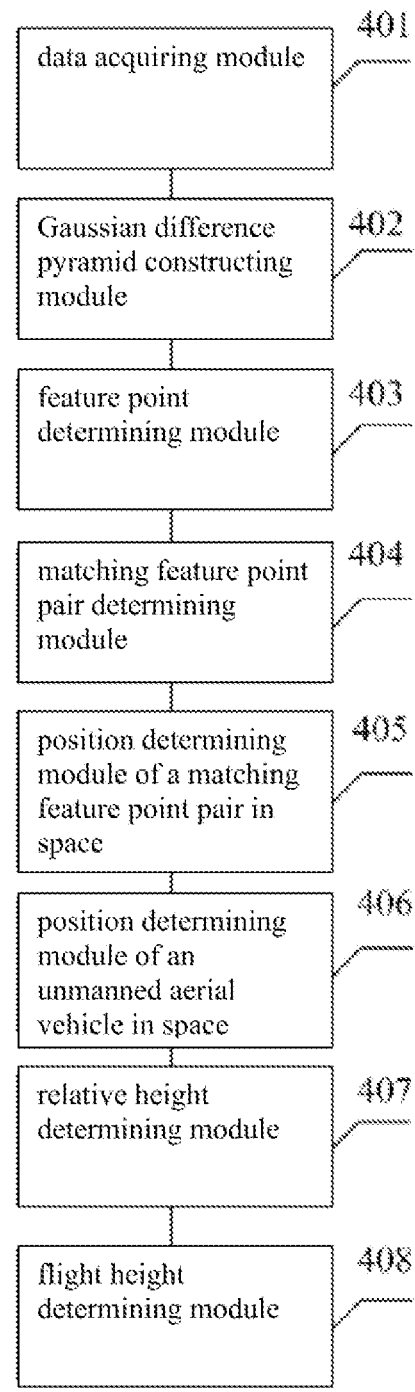
FIG. 4 is a structural schematic diagram of a system for determining the flight height of an unmanned aerial vehicle according to the present disclosure.

FIG. 4 is a structural schematic diagram of a system for determining the flight height of unmanned aerial vehicles according to the present disclosure. As shown in FIG. 4, the system for determining the flight height of unmanned aerial vehicles according to the present disclosure comprises a data acquiring module 401, a Gaussian difference pyramid constructing module 402, a feature point determining module 403, a matching feature point pair determining module 404, a position determining module of a matching feature point pair in space 405, a position determining module of an unmanned aerial vehicle in space 406, a relative height determining module 407 and a flight height determining module 408.

The data acquiring module 401 is configured to acquire a plurality of ground orthographic images in an agricultural operation area and the position data and attitude data of an unmanned aerial vehicle at the time of acquiring the plurality of ground orthographic images.

The Gaussian difference pyramid constructing module 402 is configured to construct a Gaussian difference pyramid according to pixel points in any two adjacent ground orthographic images.

The feature point determining module 403 is configured to determine the feature points in any two adjacent ground orthographic images according to the Gaussian difference pyramid. The matching feature point pair determining module 404 is configured to match the feature points in two adjacent ground orthographic images to determine a matching feature point pair.

The position determining module of a matching feature point pair in space 405 is configured to determine the position of the matching feature point pair in space according to the matching feature point pair.

The position determining module of an unmanned aerial vehicle in space 406 is configured to determine the position of the unmanned aerial vehicle in space according to the position data and attitude data of the unmanned aerial vehicle.

The relative height determining module 407 is configured to determine the relative height of the unmanned aerial vehicle from the canopy of farmland surface crops according to the position of the unmanned aerial vehicle in space and the position of the matching feature point pair in space.

The flight height determining module 408 is configured to determine the flight height of the unmanned aerial vehicle according to the relative height.

The system for determining the flight height of the unmanned aerial vehicle according to the present disclosure further comprises a pixel point calibrating module.

The pixel point calibrating module is configured to calibrate pixel points in the ground orthographic image by using formulas $x_{corrected}=x(1+k_1r^2+k_2r^4+k_3r^6)$, $y_{corrected}=y(1+k_1r^2+k_2r^4+k_3r^6)$, $x_{corrected}=x+[2p_1xy+p_2(r^2+2x^2)]$ and $y_{corrected}=y+[p_1(r^2+2y_2)+2p_2xy]$; where $k_1$, $k_2$, and $k_3$ are radial distortion factors, $p_1$ and $p_2$ are tangential distortion factors, x and y are pixel point coordinates, $x_{corrected}$ and $y_{corrected}$ are the coordinates of the calibrated pixel points, and r is the distance from the pixel point to the image center point.

The matching feature point pair determining module specifically comprises: a feature description vector constructing unit, an Euclidean distance determining unit, and a matching feature point pair determining unit.

The feature description vector constructing unit is configured to construct a feature description vector corresponding to each feature point according to the feature points in the ground orthographic image.

The Euclidean distance determining unit is configured to determine the Euclidean distance between the feature points in one ground orthographic image and the feature points in another ground orthographic image according to the feature description vector corresponding to each feature point.

The matching feature point pair determining unit is configured to take the feature point pair whose Euclidean distance is less than the distance threshold as the matching feature point pair, wherein the matching feature point pair comprises two feature points and is located in different ground orthographic images.

In this specification, each embodiment is described in a progressive manner, and each embodiment focuses on the differences from other embodiments. It is sufficient to refer to the same and similar parts between each embodiment. For the system disclosed in the embodiment, because it corresponds to the method disclosed in the embodiment, the description is relatively simple, and the relevant points can be found in the description of the method.

In the present disclosure, a specific example is applied to illustrate the principle and implementation of the present disclosure. The explanation of the above embodiments is only used to help understand the method and its core idea of the present disclosure; at the same time, according to the idea of the present disclosure, there will be some changes in the specific implementation and application scope for those skilled in the art. To sum up, the contents of this specification should not be construed as limiting the present disclosure.

We claim:

1. A method for determining the flight height of an unmanned aerial vehicle comprising:
   acquiring a plurality of ground orthographic images in an agricultural operation area and position data and attitude data of an unmanned aerial vehicle at time of acquiring the plurality of ground orthographic images;
   constructing a Gaussian difference pyramid according to pixel points in any two adjacent ground orthographic images;
   determining feature points in any two adjacent ground orthographic images according to the Gaussian difference pyramid;
   matching the feature points in two adjacent ground orthographic images to determine a matching feature point pair, comprising:
      constructing a feature description vector corresponding to each feature point according to the feature points in the ground orthographic image;
      determining a Euclidean distance between the feature points in one ground orthographic image and the feature points in another ground orthographic image according to the feature description vector corresponding to each feature point; and
      taking the feature point pair whose Euclidean distance is less than the distance threshold as the matching feature point pair, wherein the matching feature point pair comprises two feature points and is located in different ground orthographic images;
   determining a position of the matching feature point pair in space according to the matching feature point pair;
   determining the position of the unmanned aerial vehicle in space according to the position data and attitude data of the unmanned aerial vehicle;
   determining the relative height of the unmanned aerial vehicle from the canopy of farmland surface crops according to the position of the unmanned aerial vehicle in space and the position of the matching feature point pair in space; and
   determining the flight height of the unmanned aerial vehicle according to the relative height.

2. The method for determining the flight height of an unmanned aerial vehicle according to claim 1, wherein prior to constructing a Gaussian difference pyramid according to pixel points in any two adjacent ground orthographic images, the method further comprises:
   calibrating pixel points in the ground orthographic image by using formulas $x_{corrected}=x(1+k_1r^2+k_2r^4+k_3r^6)$, $y_{corrected}=y(1+k_1r^2+k_2r^4+k_3r^6)$, $x_{corrected}=x+[2p_1xy+p_2(r^2+2x^2)]$ and $y_{corrected}=y+[p_1(r^2+2y_2)+2p_2xy]$;
   wherein $k_1$, $k_2$, and $k_3$ are radial distortion factors, $p_1$ and $p_2$ are tangential distortion factors, x and y are pixel point coordinates, $x_{corrected}$ and $y_{corrected}$ are the coordinates of the calibrated pixel points, and r is the distance from the pixel point to the image center point.

3. A system for determining the flight height of an unmanned aerial vehicle, comprising:
   a data acquiring module configured to acquire a plurality of ground orthographic images in an agricultural operation area and position data and attitude data of an unmanned aerial vehicle at time of acquiring the plurality of ground orthographic images;
   a Gaussian difference pyramid constructing module configured to construct a Gaussian difference pyramid according to pixel points in any two adjacent ground orthographic images;
   a feature point determining module configured to determine the feature points in any two adjacent ground orthographic images according to the Gaussian difference pyramid;
   a matching feature point pair determining module configured to match the feature points in two adjacent ground orthographic images to determine a matching feature point pair, wherein the matching feature point pair determining module specifically comprises:
      a feature description vector constructing unit configured to construct a feature description vector corresponding to each feature point according to the feature points in the ground orthographic image;
      an Euclidean distance determining unit configured to determine the Euclidean distance between the feature points in one ground orthographic image and the feature points in another ground orthographic image according to the feature description vector corresponding to each feature point;
      a matching feature point pair determining unit configured to take the feature point pair whose Euclidean distance is less than the distance threshold as the matching feature point pair, wherein the matching feature point pair comprises two feature points and is located in different ground orthographic images;
   a position determining module of a matching feature point pair in space configured to determine the position of the matching feature point pair in space according to the matching feature point pair;
   a position determining module of an unmanned aerial vehicle in space configured to determine the position of the unmanned aerial vehicle in space according to the position data and attitude data of the unmanned aerial vehicle;
   a relative height determining module configured to determine the relative height of the unmanned aerial vehicle from a canopy of farmland surface crops according to the position of the unmanned aerial vehicle in space and the position of the matching feature point pair in space;
   a flight height determining module configured to determine the flight height of the unmanned aerial vehicle according to the relative height.

4. The system for determining the flight height of an unmanned aerial vehicle according to claim 3, further comprising:
   a pixel point calibrating module configured to calibrate pixel points in the ground orthographic image by using formulas $x_{corrected}=x(1+k_1r^2+k_2r^4+k_3r^6)$, $y_{corrected}=y(1+k_1r^2+k_2r^4+k_3r^6)$, $x_{corrected}=x+[2p_1xy+p_2(r^2+2x^2)]$ and $y_{corrected}=y+[p_1(r^2+2y_2)+2p_2xy]$;
   wherein $k_1$, $k_2$, and $k_3$ are radial distortion factors, $p_1$ and $p_2$ are tangential distortion factors, x and y are pixel point coordinates, $x_{corrected}$ and $y_{corrected}$ are the coordinates of the calibrated pixel points, and r is the distance from the pixel point to the image center point.

* * * * *